Aug. 5, 1924.
T. A. MARTIN
AUTOMOBILE HOIST
Filed March 2, 1922
1,503,795
3 Sheets-Sheet 2
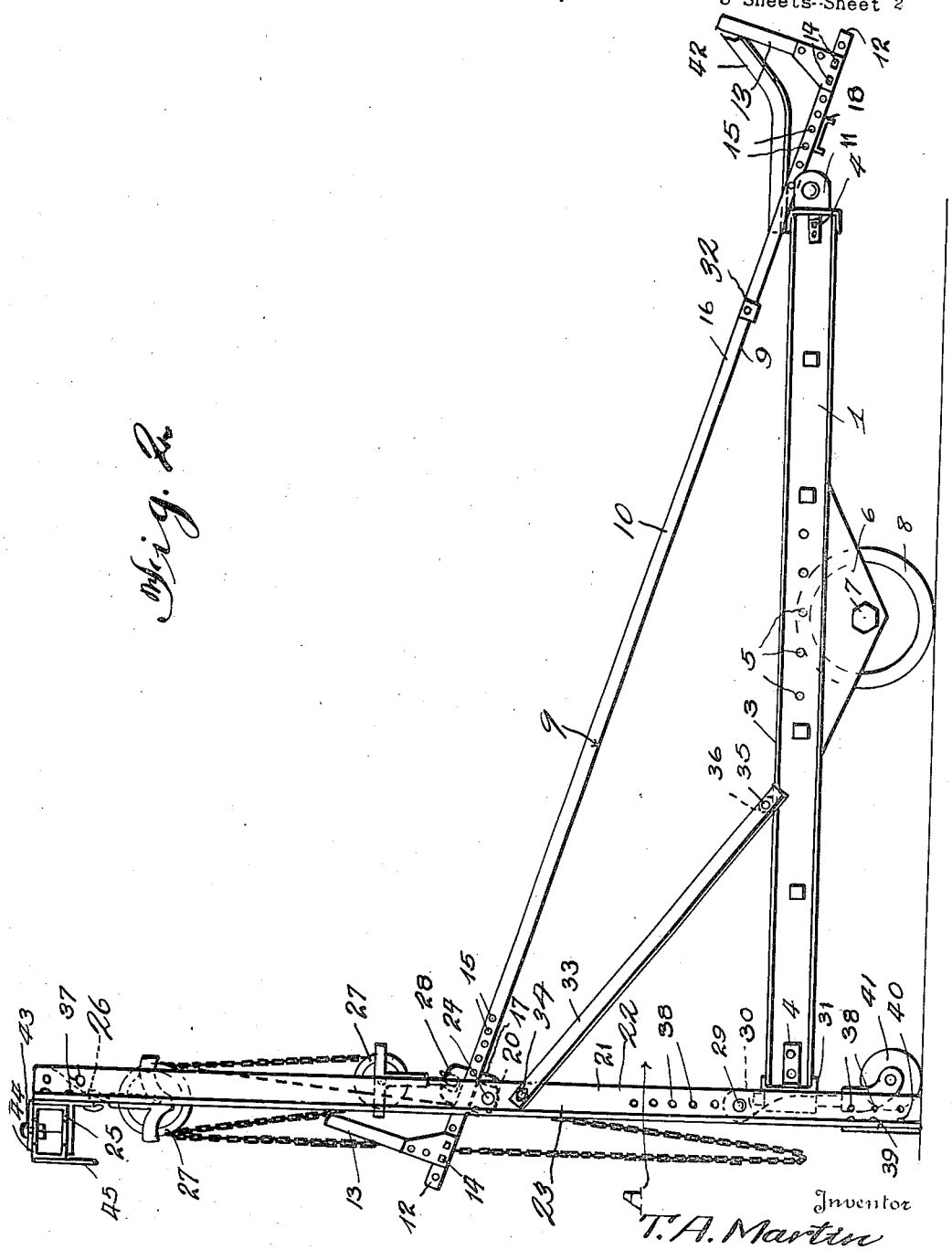

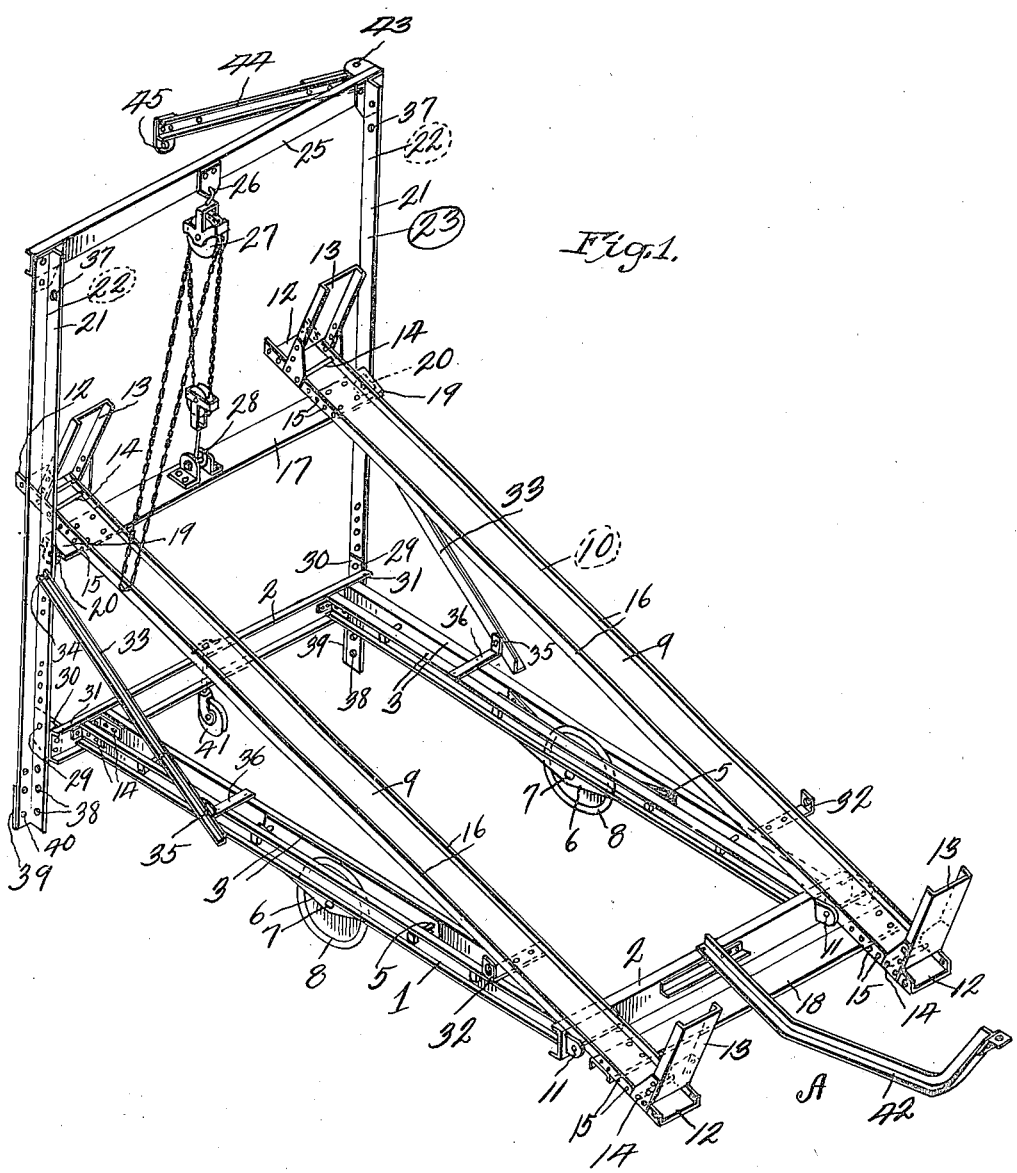

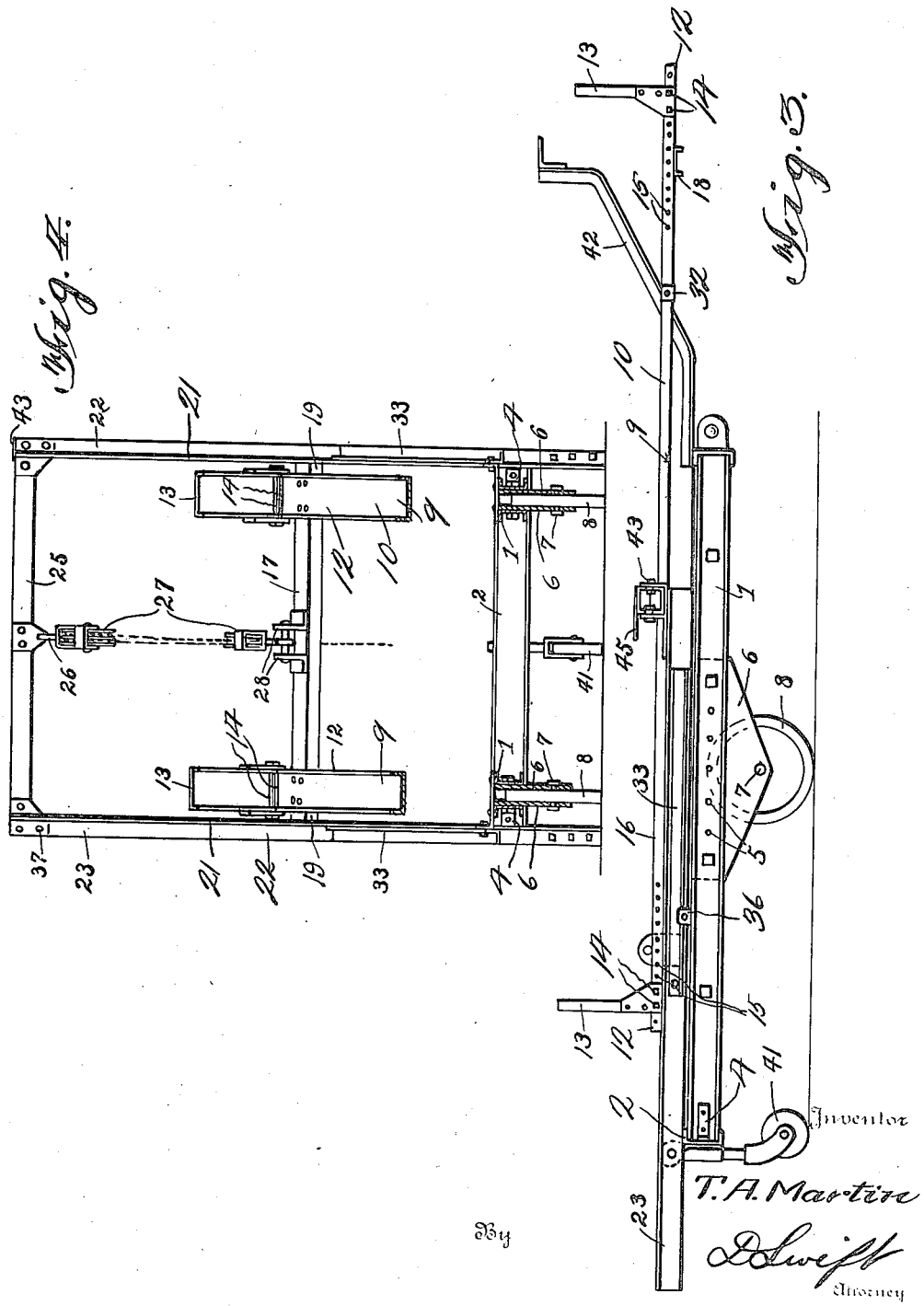

Patented Aug. 5, 1924.

1,503,795

UNITED STATES PATENT OFFICE.

THOMAS A. MARTIN, OF BRIDGEPORT, CONNECTICUT.

AUTOMOBILE HOIST.

Application filed March 2, 1922. Serial No. 540,426.

*To all whom it may concern:*

Be it known that I, THOMAS A. MARTIN, a citizen of the United States, residing at Bridgeport, in the county of Fairfield, State of Connecticut, have invented a new and useful Automobile Hoist; and I do hereby declare the following to be a full, clear, and exact description of the invention, such as will enable others skilled in the art to which it appertains to make and use the same.

The invention relates to automobile hoists and conveying devices, and has for its object to provide a device of this character comprising a rectangular and horizontally disposed wheel supported frame, which frame may be tilted on its wheels so that either end thereof may be moved downwardly into engagement with the ground, a pivoted frame pivoted to one end of the rectangular shaped frame and having wheel receiving runways which receive the wheels of the automobile when the automobile is rolled onto the pivoted frame. Also to provide the runways carried by the pivoted frame with extensions extending beyond the ends of the horizontally disposed wheel supported frame, which ends engage the ground when the device is tilted.

A further object is to provide removable vertically disposed members at the ends of the wheel runways for preventing outward movement of the automobile after being placed on the pivoted frame. Also to provide adjusting means for said vertically disposed members, thereby allowing adjustment of said members for automobiles of different wheel bases.

A further object is too provide one end of the wheel supported rectangular shaped frame with a detachably upwardly extending U-shaped member, which member arches the free end of the pivoted frame and is provided with means for attaching to the free end of the pivoted frame and pulling the same upwardly for tilting the automobile when working on the under side thereof. Also to provide detachable braces for holding the U-shaped frame in vertical position. The U-shaped frame also forms means for engaging the ground and supporting the wheel supported frame in a horizontal position.

A further object is to provide an automobile hoisting device, which may be utilized for conveying a damaged automobile from place to place and also utilized as a stiff legged derrick for pulling automobiles out of ditches.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 1 is a perspective view of the automobile hoisting and conveying device.

Figure 2 is a side elevation.

Figure 3 is a side elevation showing the device folded.

Figure 4 is a vertical transverse sectional view through the device.

Referring to the drawings, the numeral 1 designates a rectangular shaped frame, which frame is formed from end channel members 2, and side spaced channel members 3. The ends of the side spaced channel members 3 are secured by means of angle plates 4 within the end channel members 2. It will be seen that by forming the device from channels that a strong and rigid frame is provided, which will support the weight of an automobile or truck. Secured at 5 to the inner faces of the spaced channels 3 are downwardly extending brackets 6, through which brackets bolts 7 extend, on which are rotatably mounted supporting wheels 8. It will be seen that supporting wheels 8 are oppositely disposed and substantially centrally disposed in relation to the ends of the frame 1, thereby allowing either end of the frame 1 to be moved downwardly into engagement with the ground, when an automobile is being run or pushed onto the wheel receiving channel runways 9 of the auxiliary pivoted rectangular shaped frame 10, which frame is pivoted at 11 to one of the transversely disposed end channel members 2 of the main frame 1. The ends 12 of the wheel receiving channel members 9 extend beyond the ends of the frame 1, therefore it will be seen that when the channel members 9 of the auxiliary frame 10 are in lowered position in engagement with the upper sides of the spaced channel members 3 and the device as a whole tilted, said ends 12 of the channels 9, according to the direction of tilting of the device, will engage the ground and be inclined slightly thereby allowing the damaged automobile to be moved onto the device. The vertically disposed brackets 13, which are detachably secured by means of bolts 14 to the ends 12 of the wheel receiving channel members 9, are removed from the ends 12 which are in engagement with the ground thereby allowing the automobile to be moved onto the channel members 9, after which the removed brackets 13 are again attached to the ends 12 from which they have been removed. The brackets 13 are adjustably inwardly and outwardly on the ends 12 according to the length or wheel base of the automobile being hoisted or conveyed and are held in adjusted positions by means of the bolts 14, which are passed through any of the spaced apertures 15 in the flanges 16 of the wheel receiving channel members 9. By detachably connecting the brackets 13 to the ends 12 of the channel wheel receiving members 9, it is obvious that the device may be tilted in either direction allowing an automobile to be placed on the device from either end, however automobiles are preferably placed on the device from the end A.

The wheel receiving channels 9 of the auxiliary frame 10 are connected together adjacent their ends by transversely disposed channel members 17 and 18, which members brace the channel members 9 and in connection therewith form the auxiliary frame 10. The ends 19 of the transversely disposed channel member 17 extend beyond the outer side of the wheel receiving channel members 9, and terminate in ears 20 in parallel relation with the flanges 21 of the vertically disposed arms 22 of a vertically disposed frame 23, and through which flanges of the ends 9 and the flanges 21 of the arms 22 bolt 24 extend for holding the auxiliary frame 10 in tilted position as shown in Figure 1, for instance while a mechanic is working on the under side of the automobile thereby allowing ready access to the various parts of the automobile. The vertically disposed frame 23 is provided with a transversely disposed portion 25 disposed above the free end of the pivoted auxiliary frame 10 and connected at 26 thereto is a conventional form of block and fall 27, preferably of the duplex chain type, which block and fall is in turn connected at 28 to the transversely disposed channel member 17 of the pivoted frame 10, and by means of which block and fall, the free end of the auxiliary frame may be raised and the vehicle thereon tilted. The lower ends of the arm 22 are pivotally and adjustably connected at 29 to plates 30 carried by the ends 31 of the transversely disposed channel member 2, which ends 31 extend beyond the outer sides of the spaced channel members 3, thereby allowing the vertically disposed frame 23, when folded downwardly, to be disposed outside of the outer channel members 3 and in position where their flanges 21 will be received by the supporting arms 32 secured to the under faces of the wheel receiving channels 9, that is when the wheel channels 9 are in lowered positions and in engagement with the upper sides of the spaced channels 3. To hold the vertical frame 23 in vertical position as shown in Figure 1, braces 33 are provided, which braces are pivoted at 34 to the flanges 21 of the arms 22 and at 35 to outwardly extending arms 36 carried by the upper sides of the spaced channel members 3 of the main frame 1. The connecting point 35 is preferably by means of a bolt, thereby allowing the lower ends of the braces 33 to be detached, folded upwardly and secured to the flanges 21 by passing bolts through the free ends of the braces 33 and the apertures 37 in the flanges 21 of the arms 22. The flanges 21 of the arms 22 are provided with spaced apertures 38, which allow the main frame 1 to be adjusted at different distances from the lower ends of the arms 22, for instance when it is desired to have the other end of the frame 1 to rest on the ground or floor in such a manner that the device will be prevented from rolling out of position. However the lower ends of the arms 22 of the vertically disposed frame 23 are provided with extensible plates 39, which are held in various extended positions by means of bolts 40. To maintain the frame 1 in a horizontal position a supporting castor 41 is provided, which castor, not only supports the frame in a horizontal position, but also provides means which will support the frame and at the same time allow the device as a whole to be turned around on the supporting wheels 8, for instance where the device is in a garage and a short turning is essential on account of the crowded condition. Extending forwardly from one of the transversely disposed channel bars 2 is a draw bar 42, which draw bar may be attached to a vehicle in such a manner that the device, with the automobile or truck thereon, may be moved to a repair shop or garage.

Pivotally connected at 43 to one side of the upper end of the vertically disposed frame 23 is a horizontally movable arm 44, in the eye 45 of which the block and tackle may be attached and the device used as a crane on which heavy machinery may be hoisted, such for instance as the engine of an automobile, when being removed or replaced.

Where an automobile is in a ditch the device may be placed adjacent one side of the ditch and used as a stiff neck derrick for pulling the automobile out of the ditch.

From the above it will be seen that an automobile carrying, supporting and tilting truck is provided, which truck is simple in construction may be folded into a compact form, and the automobile held in a horizontal position, or when so desired the automobile may be held in an inclined position, in such a manner that workmen may work under the automobile.

The invention having been set forth what is claimed as new and useful is:—

1. An automobile conveying and supporting truck, said truck comprising a horizontally disposed frame, said frame being tiltable, an auxiliary frame disposed on the frame and pivoted thereto at one end, said auxiliary frame being provided with wheel receiving channels for the reception of automobile wheels, detachable brackets extending upwardly from the wheel receiving channels adjacent their outer ends, said brackets being inwardly and outwardly adjustable, the ends of the wheel receiving channels extending beyond the ends of the frame, a vertically disposed frame pivoted to one end of the frame and arching the free end of the auxiliary frame, a block and tackle carried by the vertically disposed frame and connected to the free end of the auxiliary frame and means for holding the free end of the auxiliary frame in raised position.

2. An automobile conveying and supporting device, said device comprising a main frame, an auxiliary frame pivoted to one end of the main frame and adapted to receive a vehicle, the ends of the auxiliary frame extending beyond the ends of the main frame, detachable and inwardly and outwardly adjustable brackets carried by the ends of the auxiliary frame, a vertically disposed U-shaped frame pivoted to one end of the main frame and arching the free end of the auxiliary frame, a block and tackle carried by the U-shaped frame and connected to the free end of the auxiliary frame, means for holding the U-shaped frame in vertical position and means for securing the free end of the auxiliary frame to the U-shaped frame and holding the auxiliary frame in raised position.

3. An automobile supporting device, said device comprising a rectangular shaped frame, wheels supporting said frame, an auxiliary frame pivoted to one end of the frame and disposed thereover, wheel channels carried by the auxiliary frame, said wheel channels extending beyond the ends of the frame, outwardly and inwardly adjustable wheel engaging brackets carried by the channels adjacent their ends, a vertically disposed member pivoted to one end of the frame adjacent the free end of the auxiliary frame, means carried by the vertically disposed frame for raising the free end of the auxiliary frame, means for holding the auxiliary frame in raised position, said vertically disposed frame being pivoted to the frame in such a manner that it will fold downwardly onto the auxiliary frame, braces for the auxiliary frame and means whereby said braces will fold against the vertical frame.

In testimony whereof I have signed my name to this specification in the presence of two subscribing witnesses.

THOMAS A. MARTIN.

Witnesses:
W. M HOFFMAN,
PHILIP W. H. TERRELL.